United States Patent
Berggren et al.

(10) Patent No.: US 12,439,359 B2
(45) Date of Patent: Oct. 7, 2025

(54) NOTIFICATION AREA MANAGEMENT IN A WIRELESS NETWORK

(71) Applicant: Sony Group Corporation, Tokyo (JP)

(72) Inventors: Anders Berggren, Lund (SE); Lars Nord, Lund (SE)

(73) Assignee: Sony Group Corporation, Tokyo (JP)

( * ) Notice: Subject to any disclaimer, the term of this patent is extended or adjusted under 35 U.S.C. 154(b) by 456 days.

(21) Appl. No.: 17/801,680

(22) PCT Filed: Feb. 10, 2021

(86) PCT No.: PCT/EP2021/053234
§ 371 (c)(1),
(2) Date: Aug. 23, 2022

(87) PCT Pub. No.: WO2021/175548
PCT Pub. Date: Sep. 10, 2021

(65) Prior Publication Data
US 2023/0129653 A1    Apr. 27, 2023

(30) Foreign Application Priority Data
Mar. 5, 2020  (SE) .................... 2050252-2

(51) Int. Cl.
*H04W 60/04* (2009.01)
*H04W 48/16* (2009.01)
(Continued)

(52) U.S. Cl.
CPC ........... *H04W 60/04* (2013.01); *H04W 48/16* (2013.01); *H04W 48/20* (2013.01); *H04W 88/085* (2013.01)

(58) Field of Classification Search
CPC ..... H04W 60/04; H04W 76/27; H04W 48/16; H04W 48/20; H04W 88/085
See application file for complete search history.

(56) References Cited

U.S. PATENT DOCUMENTS

2010/0075698 A1   3/2010   Rune
2018/0234890 A1*  8/2018   Shih .................. H04W 36/0005
(Continued)

FOREIGN PATENT DOCUMENTS

CN    108616943 A    10/2018
CN    109729529 A    5/2019
(Continued)

OTHER PUBLICATIONS

U.S. Appl. No. 62/843,292, Specification, May 3, 2019 (Year: 2019).*

(Continued)

*Primary Examiner* — Ji-Hae Yea
(74) *Attorney, Agent, or Firm* — Tucker Ellis LLP

(57) ABSTRACT

A method for operating a first base station for configuration of a notification area, wherein first base station includes a first central unit, CU, and one or more first distributed units, DU, controlled by the first CU, the method including: receiving first information identifying a notification area update from a second base station including a second CU and one or more second DUs controlled by the second CU, wherein said first information is based on a message identifying a notification area update procedure obtained in one of said second DUs from a user equipment, UE, being configured with a first notification area including the first base station; establishing a connection between said first CU and said one second DU; and configuring the UE with second information identifying an addition of said one second DU to said first notification area.

18 Claims, 6 Drawing Sheets

(51) Int. Cl.
    *H04W 48/20*     (2009.01)
    *H04W 88/08*     (2009.01)

(56) References Cited

U.S. PATENT DOCUMENTS

| | | |
|---|---|---|
| 2018/0270895 A1 | 9/2018 | Park |
| 2019/0253966 A1* | 8/2019 | Park ................. H04W 52/0209 |
| 2019/0289505 A1 | 9/2019 | Thomas |
| 2020/0383164 A1 | 12/2020 | Kim |
| 2022/0210647 A1* | 6/2022 | Centonza ............ H04L 12/4633 |

FOREIGN PATENT DOCUMENTS

| | | |
|---|---|---|
| EP | 3609289 A1 | 2/2020 |
| IN | 201917039731 A | 11/2019 |
| KR | 20190013633 A | 2/2019 |

OTHER PUBLICATIONS

International Search Report and Written Opinion from corresponding International Application No. PCT/EP2021/053234, mailed on May 14, 2021, 9 pages.

LG Electronics Inc., "Issues on RRC-INACTIVE state in CU-DU split", 3GGP TSG-RAN WG3 Meeting #97bis, R3-173874, Oct. 9-13, 2017, 6 pages.

Office Action and Search Report from corresponding Swedish Application No. 2050252-2, mailed on Jan. 27, 2021, 11 pages.

Intel Corporation, "Consideration on periodic RNAU without anchor relation", 3GPP TSG-RAN WG3 Meeting #99bis, R3-182053, Apr. 16-20, 2018, 2 pages.

\* cited by examiner

NOTIFICATION AREA MANAGEMENT IN A WIRELESS NETWORK

TECHNICAL FIELD

This disclosure relates to methods and devices in a radio communication system, comprising a wireless network and a wireless terminal. Specifically, solutions are provided for managing a notification area for a terminal which is mobile between various cells of the wireless network while being suspended or inactivated from the connection to a radio access network of the wireless network.

BACKGROUND

In radio communication systems, such as various generations provided through the 3rd Generation Partnership Project (3GPP), various generations of specifications have been provided for setting up common rules for establishing and operating both a wireless radio interface between a wireless terminal and a base station, and various levels of operation of the network. In 3GPP documentation, a terminal is commonly referred to as a User Equipment (UE), a term that will be used consistently herein for the sake of simplicity. A base station, operative to provide radio access to UEs within a cell, also referred to as an access node, and various terms are used in 3GPP for different types of systems or specification. In the so-called 3G specifications, also referred to as the Universal Mobile Telecommunications System (UMTS), the term NodeB is used to denote a base station, whereas in the so-called 4G specifications, also referred to as Long-Term Evolution (LTE), the term eNodeB (eNB) is used. A further developed set of specifications for radio communication are referred to as the 5G type radio communication system (5GS), including the New Radio (NR) technology, wherein the term gNodeB (gNB) is used to identify a base station.

For many types of radio communication systems, different states may be defined in which operation of the various parties may take different form. Generally, at least two different states, e.g. RRC Idle and RRC Connected in the RAN domain, may be defined in most types of a radio communication systems.

In an idle state, the UE will be held in an idle mode in which it is not currently transmitting or receiving data. In such a state, the UE may e.g. periodically listen to signals transmitted from base stations for the purpose of maintaining minimum contact with the network through a base station of a cell to which the UE camps, e.g. to maintain synchronization, listen for system information and be prepared for receiving a paging message in case there is downlink traffic addressed to the UE.

In connected state or active state, one or more radio resources have been provided to the UE forming an active dedicated connection through a base station, for reception or transmission of data. The UE will then be in a connected mode.

Going from an idle state to a connected state hence involves an access procedure, to set up an active radio link for data communication. Such an access procedure is normally initiated on a random access channel (RACH), and will not be outlined in detail herein. However, when a UE initiates going to a connected state, this may involve signaling and message communication with another cell and base station than a last base station through which the UE had an established connection in a connected state. However, efforts in 4G and 5G have been made to reduce the overall system signaling. In 4G the feature is called User Plane EPS CIoT (Evolved Packet System—Cellular Internet of Things) optimization and in 5G there are two features called CM CONNECTED with RRC_Inactive state and User Plane 5GS CIoT optimization. Both solutions are based on that information related to the UE's connection is stored in the access node to which the UE last connected, also referred to as an anchor node, and the information is reused using Suspend/Release and Resume functionality. The UE specific information is also known as a UE context. When the UE is powered up it has no state and needs to do an initial attach to be registered in the CoreNetwork. After the registration, the UE will end up camping in Idle mode. Later, in case of downlink or uplink traffic is initiated, the UE can move to RRC connected with connection establishment procedure. If there is no activity from UE for some time, RAN can suspend the UE and its Radio Connection by moving the UE to RRC Inactive, or RRC Idle (User Plane 5GS CIoT optimization). Note that when using the RRC inactive feature, the Core Network PDU session and the N3 tunnel remains active i.e. the PDU session and the N3 tunnel is not suspended and no signaling between CN and RAN is needed for transferring the data when the UE resumes the radio connection. The UE can later resume its Radio Connection moving to RRC connected mode.

When using the RRC Inactive feature, the wireless network may be configured with a notification area, comprising a plurality of cells, each served by one or more base stations. The notification area identifies the cells in which paging will be carried out by the RAN, if the network is configured to connect to the UE. In case the UE is moving between different notification areas, this will result in a re-anchoring of the UE, wherein the UE context is moved to another base station, new anchor node, for which another notification area is configured. In a system where a UE context or connection data is stored or maintained in a previously used base station, the UE may later initiate network connection through another base station either based on paging message related to Downlink traffic or initiates the RACH procedure based on Uplink traffic. The setup of a connection may involve a fair amount of processing and signaling at least within the radio access network, before any data packets may be routed to a core network of the wireless network. The signaling may involve transferring of the context and switch the tunnel(s) between the base station and the core network, from a former to a new base station.

SUMMARY

A general object is to provide a solution for data routing in a wireless network including a radio access network, particularly in a situation when a UE which has been suspended from connection to the network attempts to get connected through one base station for sending data, and information relating to a previous connection is stored in another base station. Specifically, it is an objective to provide such a solution in a scenario in which one or more base stations of the radio access network comprise a central unit and one or more distributed units, controlled by the central unit.

The solution as proposed herein is defined by the terms of the independent claims, whereas various embodiments are outlined in the dependent claims.

According to a first aspect, the solution involves a method for operating a first base station for configuration of a notification area, wherein first base station comprises a first central unit, CU, and one or more first distributed units, DU, controlled by the first CU, the method comprising:

receiving first information identifying a notification area update from a second base station comprising a second CU and one or more second DUs controlled by the second CU, wherein said first information is based on a message obtained in one of said second DUs from a user equipment, UE, being configured with a first notification area comprising the first base station;

establishing a connection between said first CU and said one second DU; and configuring the UE with second information identifying an addition of said one second DU to said first notification area.

According to a second aspect, the solution involves a method for operating a user equipment, UE, to configure a notification area in a radio access network, comprising receiving information identifying a first notification area comprising a first base station, which first base station comprises a first central unit, CU, and one or more first distributed units, DU, controlled by the first CU;

receiving, from a second base station, a signal identifying a second DU not forming part of the first notification area;

transmitting a first message to the second base station;

receiving a second message from the second DU comprising updated notification area information identifying an addition of said second DU to said first notification area.

The proposed solutions mitigates undue signaling in the wireless network by providing updated configuration of a UE-specific notification area rather than performing a re-anchoring procedure which would involve transferring of the UE context between the old RAN anchor node and the new anchor node, release and new establishment of tunnel(s) between the core network and RAN anchor node of a new notification area configuration.

BRIEF DESCRIPTION OF THE DRAWINGS

Various embodiments will be described with reference to the drawings, in which.

DETAILED DESCRIPTION

Figure 1:
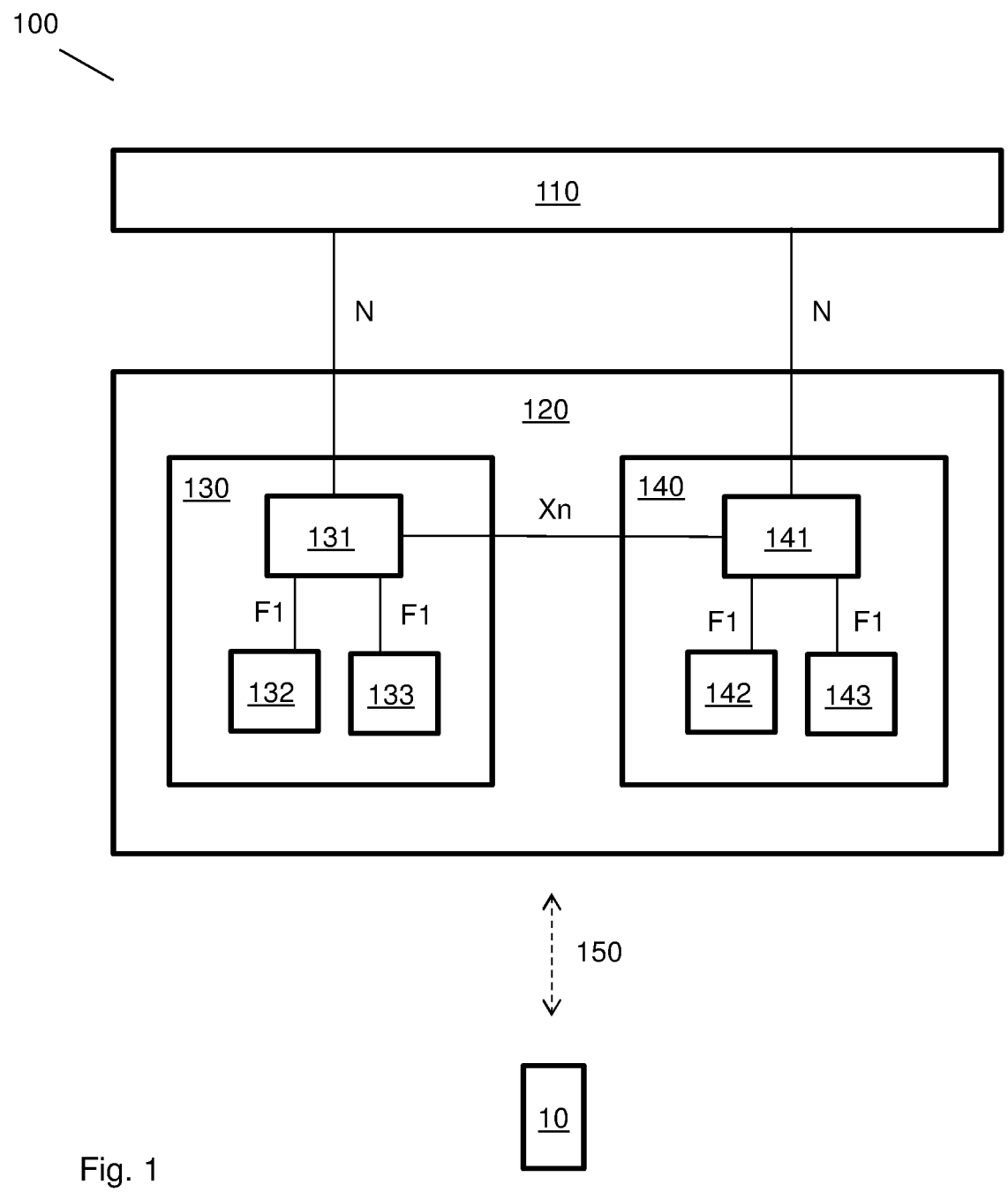
FIG. 1 schematically illustrates a wireless network comprising a radio access network which includes at least two base stations, wherein each base station comprises a central unit and at least one distributed units.

The invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, when an element is referred to as being "connected" to another element, it can be directly connected to the other element or intervening elements may be present. In contrast, when an element is referred to as being "directly connected" to another element, there are no intervening elements present. Like numbers refer to like elements throughout. It will furthermore be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

Well-known functions or constructions may not be described in detail for brevity and/or clarity. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

Embodiments of the invention are described herein with reference to schematic illustrations of idealized embodiments of the invention. As such, variations from the shapes and relative sizes of the illustrations as a result, for example, of manufacturing techniques and/or tolerances, are to be expected. Thus, embodiments of the invention should not be construed as limited to the particular shapes and relative sizes of regions illustrated herein but are to include deviations in shapes and/or relative sizes that result, for example, from different operational constraints and/or from manufacturing constraints. Thus, the elements illustrated in the figures are schematic in nature and their shapes are not intended to illustrate the actual shape of a region of a device and are not intended to limit the scope of the invention.

It may be noted that where this disclosure mentions transmission or reception of information, this information may be conveyed in one or more messages.

Various embodiments are outlined herein, generally suitable for employment in a 3GPP radio communication network. For this reason, the term UE is frequently used to denote a UE, and NB, eNB or gNB are terms used to denote a radio access node or base station. A Radio Access Network (RAN) may include a number of base stations, which are connectable to a Core Network (CN).

In LTE, a UE may be in idle or connected mode, with respect to the network. An idle UE has no dedicated signaling or data bearers associated with it. In other words, no network/radio resources are specifically allocated to it. An idle UE's location is known to the network only within a contiguous groups of cells, called tracking area. While an idle UE is not attached to any base station, it is required to select a suitable cell and camp on it. The procedure of an idle UE selecting and camping on a cell is known as Cell Selection. An idle UE, while camping on a cell, continues to regularly monitor the signal quality of the camped cell. In case a quality level criteria is met, (e.g. the signal quality is lower than a threshold), the UE may monitor other cells and may decide to camp on another cell if radio conditions indicates a benefit to do so, for example, due to UE mobility. This process is known as Cell Reselection. The criteria to be adopted by an idle UE for selecting/reselecting a cell are communicated to the UE via the system information broadcast messages periodically by each cell.

In the 5G network a new operational state is defined, called Inactive State or RRC_Inactive. In this state, the UE is still in CM_Connected state in the CN, meaning that there is a pending active session to the CN, which session is associated with the UE. More specifically, this may involve maintaining active interfaces between the RAN and the CN, including N2 (signaling interface between RAN and CN) and N3 (user data interface between RAN and CN). These interfaces are maintained active within the base station where the last traffic was performed, typically the last base station to which the UE was connected in RRC_Connected state. From a RAN perspective the UE is in RRC-Inactive state with the UE context stored in RAN, meaning that the UE will perform similar tasks as when the UE is in idle mode.

One difference, from the UE point of view, between RRC_Inactive and RRC_Idle is the area the UE needs to monitor, or the area where the UE can reselect cells without informing the network. In the state RRC_IDLE and CM_Idle, where the UE is in idle mode, the UE monitors the registered area (RA) which could be a TA or a list of TA's. If the UE moves out of this Area, the UE needs to perform mobility registration. In the state RRC_Inactive, wherein the UE also needs to monitor cell performance and if needed reselect cell to camp on in an area, the area in this case is configured by RAN and it is called a RAN Notification Area (RNA). If the UE moves out of the RNA the UE needs to perform RNA update due to mobility.

The RNA may consist of a number of cells that are connected or have an interface to the cell or base station the UE was last connected to, also referred to as an anchor cell. The RAN anchor cell is the RAN node that has the N2 and N3 interface to the CN (Control plane and User plane). These interfaces are similar to the S1-C and S1-U interfaces of LTE. The base stations of the other cells of the RNA are connected to the anchor cell base station by means of a logical inter-node interface. In 5G, this interface, or set of interfaces, is referred to as Xn interface, and has a similar purpose as the X2 interface defined for LTE. The Xn interface is used between two gNBs connected to the CN and supports several functions. This includes control plane functions such as interface management and error handling, connected mode mobility management, UE context forwarding, support of RAN paging etc., and user plane functions such as data forwarding and flow control.

FIG. 1 illustrates a wireless network 100 according to various embodiments. The wireless network 100 may be a radio communication network operating under general and specific regulations and limits published by the 3GPP, such as a New Radio (NR) network. The wireless network 100 may include a core network 110, which is connected to other networks, such as the Internet. The wireless network 100 further includes an access network 120, which comprises a plurality of base stations or access nodes, of which a first base station 130 and a second base station 140 are shown.

Moreover, a UE 10 is illustrated, which may access the wireless network through any of the base stations included in the RAN 120. The UE 10 may be any device operable to wirelessly communicate with the network 100 through the base station 130, 140, such as a mobile telephone, computer, tablet, a M2M device, an IoT device or other.

In a scenario where the UE 10 is RRC_Inactive, the UE 10 is suspended from radio connection to the network 100, specifically the access network 120, while an active session to the CN 110 is maintained for the UE 10. In such a scenario, the RAN 120 needs to define a suitable notification area, or RAN paging areas. This could be either statically defined, e.g. including a last cell used cell and possibly a first, second or third ring of cells surrounding the last used cell. Alternatively, the notification area may be more dynamically allocated, e.g. based on neighbor cell measurements which the UE 10 has done in connected mode and reported to a serving base station. The notification area, such as the RNA, is defined by a list of cells. As specified in 3GPP technical specification 38.300, the state RRC_inactive relates to where the UE 10 remains in CM-CONNECTED and can move within an area configured by the RNA, without notifying the anchor RAN node/cell. In RRC_inactive, the last serving base station keeps the UE context and the UE-associated N2 connection with the serving AMF (Access & Mobility management Function) and N3 connection UPF (User Plane Function), both being indicated by an N connection in FIG. 1 for the sake of simplicity. If the last serving base station receives downlink (DL) data from the UPF or DL UE-associated signaling from the AMF (except for UE Context Release Command message) while the UE is in RRC_inactive, the last serving base station pages in the cells corresponding to the RNA and may send so called XnAP RAN Paging to neighbor base stations.

In the RAN 120 of FIG. 1, at least the two base stations 130 and 140 are configured with an architecture wherein the base station functionality is divided into two different types of entities. The first base station 130 comprises a first entity which is a central unit (CU) 131 and a second entity which is one or several distributed unit(s) (DU) 132, 133. Correspondingly, the second base station 140 comprises a CU 141 and a one or several DU(s) 142, 143. This architecture type is inter alia described in 3GPP technical specification TS 38.401 version 15.6.0 Release 15 section 6. The CU is handling the RRC/SDCP/PDCP and DU is handling RLC/MAC/PHY. The CU and DU are connected via a logical interface F1, which can either transport control signaling V1-C or data packet V1-U. Each DU serves one cell, and has an associated cell ID. The actual point of transmission and reception of the respective DU 132, 133, 142, 143 may be referred to as a Transmission and Reception Point (TRP), which may be seen as a network node which includes or is co-located with an antenna system of the respective DU.

In the first base station 130, one CU 131 is thus connected to several DU(s) 132, 133 and together they cover a first notification area, or a part thereof, like the RNA discussed above. Correspondingly, in the second base station 140, one CU 141 is thus connected to several DU(s) 142, 143 and together they may cover a second notification area, or a part thereof.

Figure 2:
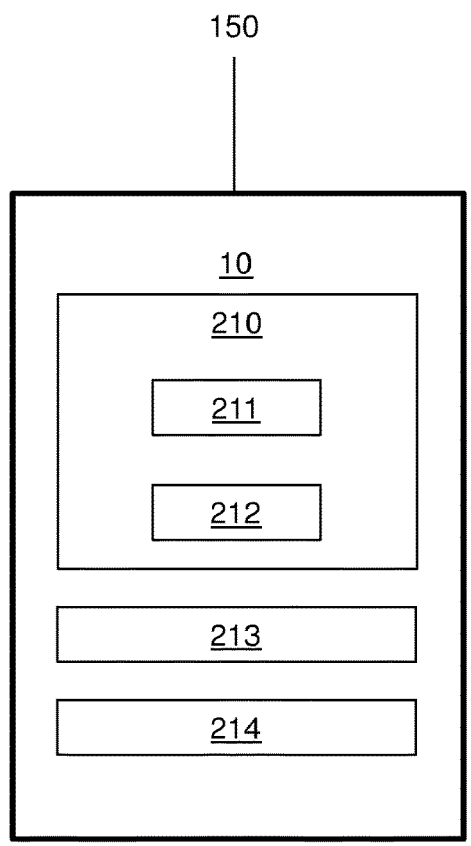
FIG. 2 schematically illustrates elements included in a UE configured in accordance with an embodiment.

FIG. 2 schematically illustrates an embodiment of the UE 10 for use in a wireless network 100 as presented herein, and for carrying out the method steps as outlined.

The UE 10 may comprise a radio unit 213 comprising a radio transceiver for communicating with other entities of the radio communication network 100, such as the base stations 130, 140, in different frequency bands. The radio unit 213 may thus include a radio receiver and transmitter for communicating through at least an air interface.

The UE 10 further comprises logic 210 configured to communicate data, via the radio unit, on a radio channel, to the wireless communication network 100 and possibly directly with another terminal by Device-to Device (D2D) communication.

The logic 210 may include a processing device 211, including one or multiple processors, microprocessors, data processors, co-processors, and/or some other type of component that interprets and/or executes instructions and/or data. Processing device 211 may be implemented as hardware (e.g., a microprocessor, etc.) or a combination of hardware and software (e.g., a system-on-chip (SoC), an application-specific integrated circuit (ASIC), etc.). The processing device 211 may be configured to perform one or multiple operations based on an operating system and/or various applications or programs.

The logic 210 may further include memory storage 212, which may include one or multiple memories and/or one or multiple other types of storage mediums. For example, memory storage 212 may include a random access memory (RAM), a dynamic random access memory (DRAM), a cache, a read only memory (ROM), a programmable read only memory (PROM), flash memory, and/or some other type of memory. Memory storage 212 may include a hard disk (e.g., a magnetic disk, an optical disk, a magneto-optic disk, a solid state disk, etc.).

The memory storage 212 is configured for holding computer program code, which may be executed by the processing device 211, wherein the logic 210 is configured to control the UE 10 to carry out any of the method steps as provided herein. Software defined by said computer program code may include an application or a program that provides a function and/or a process. The software may include device firmware, an operating system (OS), or a variety of applications that may execute in the logic 210.

The UE 10 may further comprise, or be connected to, an antenna 214, which may include an antenna array.

Obviously, the UE 10 may include other features and elements than those shown in the drawing or described herein, such as a power supply, a casing, a user interface, one or more sensors etc.

In various embodiments, the UE 10 is configured to carry out the method steps described for execution in a UE as outlined herein.

Figure 3A:
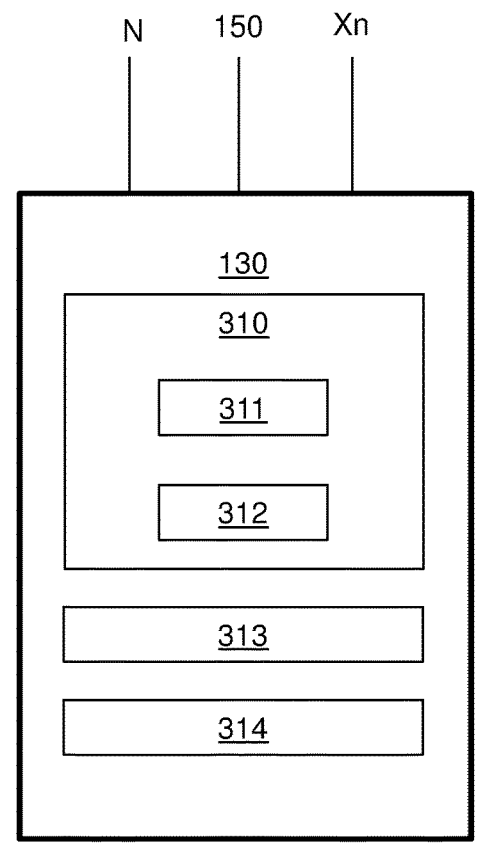
FIGS. 3A and 3B schematically illustrate functional elements included in a base station configured in accordance with various embodiments.
Figure 3B:
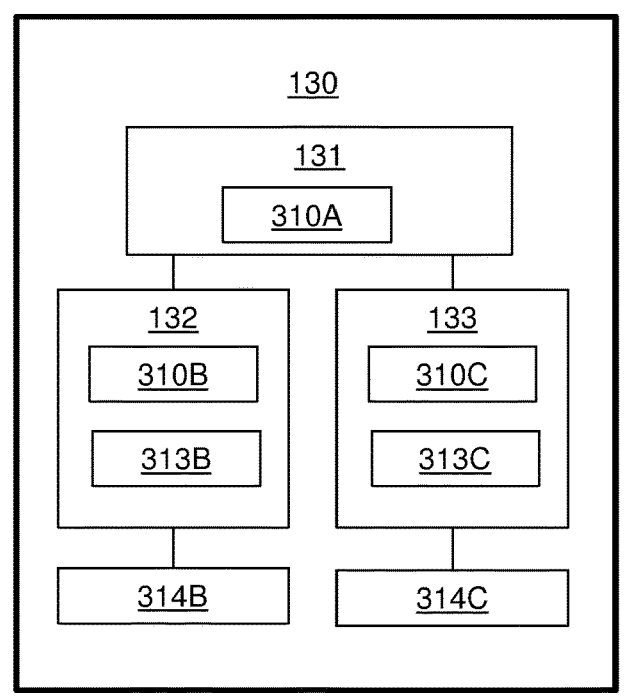

FIGS. 3A and 3B schematically illustrate a base station 130 for use in a radio communication network 100 as presented herein, and for carrying out the method steps as outlined herein. It shall be noted that the embodiment of FIGS. 3A and 3B may equally well be used for the second base station 140.

The base station is configured in accordance with the architecture illustrated in and described with reference to FIG. 1, including a CU 131 and one or more DU(s) 132, 133.

The base station 130 comprise one or more radio transceiver(s) 313 for wireless communicating with other entities of the radio communication network 100, such as the UE 10. The transceiver 313 may thus include a radio receiver and transmitter for communicating through at least an air interface. For the sake of simplicity, only one radio transceiver 313 is illustrated, but it should be noted that where more than one DU 132, 133 is included, each DU may be configured with its own respective radio transceiver.

The base station 130 further comprises logic 310 configured to communicate data, via the radio transceiver(s), on a radio channel, with UE 10. The logic 310 may include a processing device 311, including one or multiple processors, microprocessors, data processors, co-processors, and/or some other type of component that interprets and/or executes instructions and/or data. Processing device 311 may be implemented as hardware (e.g., a microprocessor, etc.) or a combination of hardware and software (e.g., a system-on-chip (SoC), an application-specific integrated circuit (ASIC), etc.). The processing device 311 may be configured to perform one or multiple operations based on an operating system and/or various applications or programs.

The logic 310 may further include memory storage 312, which may include one or multiple memories and/or one or multiple other types of storage mediums. For example, memory storage 312 may include a random access memory (RAM), a dynamic random access memory (DRAM), a cache, a read only memory (ROM), a programmable read only memory (PROM), flash memory, and/or some other type of memory. Memory storage 312 may include a hard disk (e.g., a magnetic disk, an optical disk, a magneto-optic disk, a solid state disk, etc.).

The memory storage 312 is configured for holding computer program code, which may be executed by the processing device 311, wherein the logic 310 is configured to control the base station 130 to carry out any of the method steps as provided herein. Software defined by said computer program code may include an application or a program that provides a function and/or a process. The software may include device firmware, an operating system (OS), or a variety of applications that may execute in the logic 310.

It may be noted that separate logic may be configured for operating the CU 131 and the respective DU 132, 133, while only one entity providing the logic is shown for the sake of simplicity. This is illustrated in FIG. 3B.

The base station 130 may further comprise or be connected to an antenna 314, connected to the radio transceiver 313, such as one antenna 314 for each DU 132, 133. Each antenna 314 may include an antenna array.

The base station 130 may further comprise one or more communication interfaces, such as an interface Xn operable for the base station 130 to communicate with other base stations 140, and the N2 and N3 interfaces N for communication with core network nodes. Moreover, the base station 130 may be configured with an Uu interface 150 for wireless communication with UEs such as UE 10.

FIG. 3B illustrates the functional elements as described with reference to FIG. 3A, provided as different functional blocks or objects in the CU 131 and in the different DUs 132, 133. Each of these units may comprise its own logic, i.e. a logic 310A for controlling the CU 131, a logic 310B for controlling the DU 132, and a logic 310C for controlling the DU 133. At least the DUs 132,133 may comprise separate transceivers 314B and 314C, respectively. Moreover, each DU 132, 133 comprises or is connected to each one antenna 314B and 314C, respectively. As noted, each antenna 314B, 314C may include an antenna array.

In various embodiments, the base station 130 is configured to carry out the method steps described for execution in a base station as outlined herein.

Figure 4:
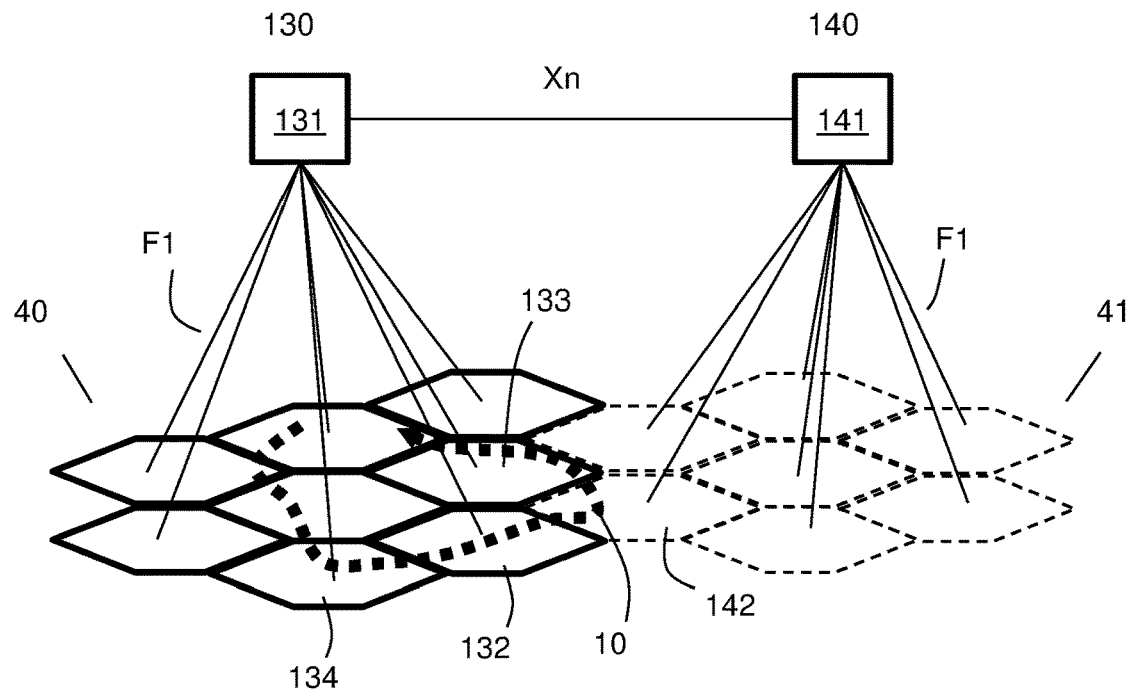
FIG. 4 illustrates movement of a UE between two different notification areas.

FIG. 4 illustrates a scenario of operation of the wireless system of FIG. 1. The drawing shows the first base station 130 to the left and the second base station to the right, both including a respective CU 131 and 141. Each base station 130, 140 further comprise a plurality of DUs, which are illustrated by means of the cells covered and served by the respective DU. The first base station 130 covers an area 40 of the combined coverage or service areas of the DUs of the first base station 130, which may be associated with a first notification area, as defined by the access network 120 of FIG. 1. The first notification area may comprise or consist of the combined coverage area of the DUs of the first base station 130. Each cell served by a DU of the first base station 130 is illustrated as a hexagon with a solid line contour. Correspondingly, the second base station 140 covers an area 41 of the combined coverage or service areas of the DUs of the second base station 140. Each cell served by a DU of the second base station 140 is illustrated as a hexagon with a dashed line contour. The coverage area 41 may be associated with a second notification area, as defined by the access network 120.

In the illustrated scenario of FIG. 4, the UE 10 moves between different notification areas 40, 41 as defined by the CU/DU configuration, as indicated by the dotted arrow. Specifically, the UE 10 moves from a cell covered by one first DU 132 to one cell covered by one second DU 142, before returning to the coverage area of another one 133 of the first DUs. This scenario will result in a re-anchoring of the UE 10, in legacy behavior. The UE context of the UE 10 is thereby moved from the old CU 131 controlling and/or serving the DU 132, to the new CU 141 controlling and/or serving the new, second, DU 142. The network functions CU/AMF/SMF/UPF will perform a path switch including signaling over NG-AP to move N2 and N3 tunnels, that connect the respectively CU 131, 141 to the Core network 110. If the UE 10 has a mobility pattern with frequent crossings of the notification area boarder, this would lead to a repeated triggering of a RAN Notification Area update procedure (i.e. re-anchoring), including signaling over the radio interface 150, as well as signaling within the network to handle path switch between the anchor nodes in the different RAN areas.

A solution is proposed herein, which allows the network 100 to mitigate the increased signaling for UE/RAN/CN with this specific or similar mobility pattern. Various aspects of this solution will now be described with reference to FIGS. 5-7.

The solution reduces signaling by reducing the need to change anchor node when the UE 10 is moving between cells belonging to different notification areas, such as RNAs. Instead of having statically defined notification areas, where a notification area update is needed every time the UE 10 is crossing the notification area border, the proposed solution involves that as soon as the UE 19 crosses the notification area border, and thereby triggers a notification area update (e.g. an RNA update), the notification area for that specific UE 10 may be dynamically updated in order to minimize the risk of triggering further notification area updates, to thereby avoid further re-anchoring of the UE 10.

From the perspective of the wireless network 100, this is obtained by means of a method for operating a first base station 130 for configuration of a notification area 40, wherein the first base station 130 comprises a first CU 131 and one or more first DU(s) 132, 133, controlled and/or served by the first CU. The method is carried out in the first base station 130 and comprises:

receiving first information identifying a notification area update from a second base station 140 comprising a second CU 141 and one or more second DUs 142,143 controlled by the second CU, wherein said first information is based on a message obtained in one 142 of said second DUs from a UE 10 being configured with a first notification area 40 comprising the first base station;

establishing a connection between said first CU and said one second DU; and configuring the UE with second information identifying an addition of said one second DU to said first notification area.

From the perspective of the UE 10, the objective is obtained by means of method for operating a UE 10 to configure a notification area in a radio access network 120, comprising receiving information identifying a first notification area 40 comprising a first base station 130, which first base station comprises a first CU 131 and one or more first DU(s) 132, 133, controlled and/or served by the first CU;

receiving, from a second base station 140, a signal identifying a second DU 142 not forming part of the first notification area;

transmitting a first message to the second base station;

receiving a second message from the second DU comprising updated first notification area information identifying an addition of said second DU to said first notification area.

Two different general embodiments are proposed herein, which nevertheless have several features in common:

According to a first proposal, a DU 142 forming part of a base station 140 having a CU 141, may be connected also to another CU 131 (anchor). DUs may thus flexibly belong to different CUs, and hence belong to different anchor nodes. General and specific aspects of this first proposal are described with reference to FIGS. 5 and 7A.

According to a second proposal, a DU 142 forming part of a base station 140 having a CU 141, may be indirectly connected to another CU 131 (anchor), e.g. via an Xn interface from the CU 141 that the DU 142 is physically connected to. General and specific aspects of this first proposal are described with reference to FIGS. 6 and 7B.

Figure 5:
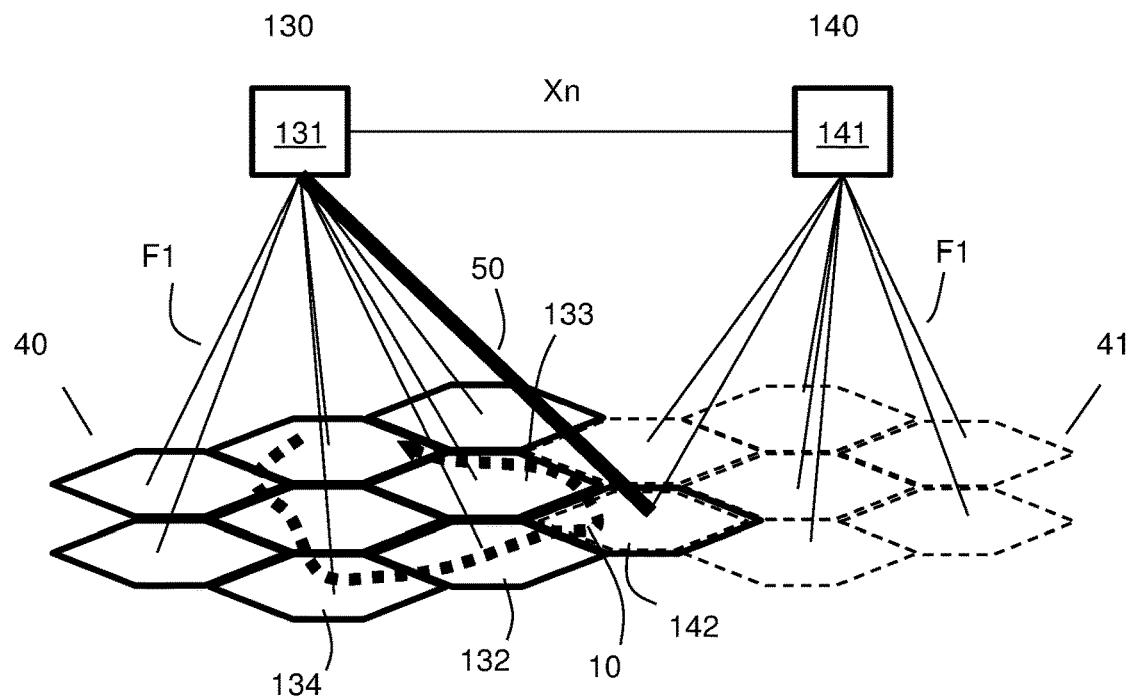
FIG. 5 schematically illustrates establishment of a connection between entities of two base stations covering different notification areas, and the forming of an updated notification area, according to various embodiments.
Figure 7A:
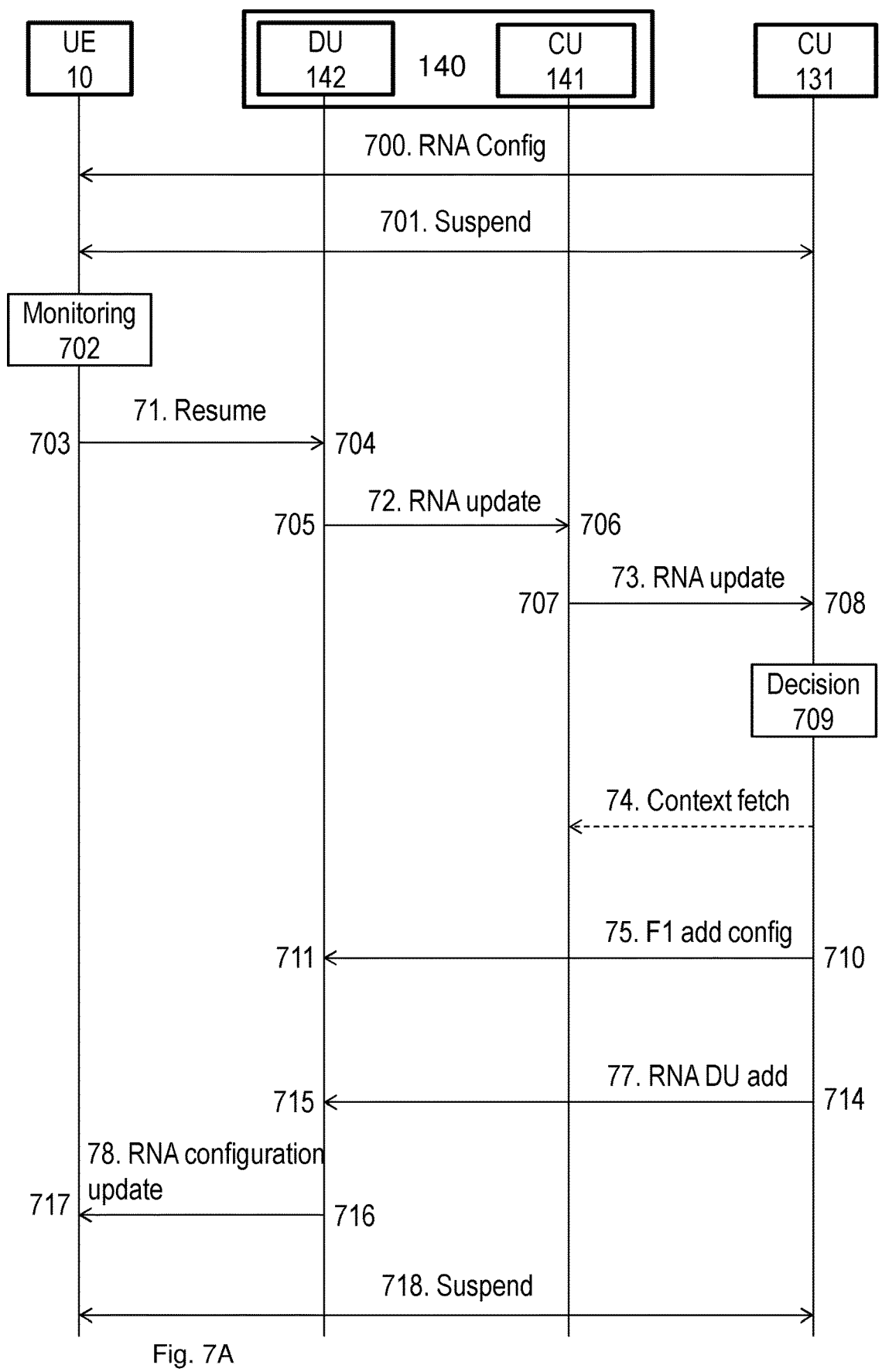
FIG. 7A schematically illustrates a signaling diagram for an embodiment operating in the scenario of FIG. 5.

FIG. 5 illustrates the same scenario of UE 10 movement as in FIG. 4, and FIG. 7A illustrates an associated signaling diagram.

Figure 6:
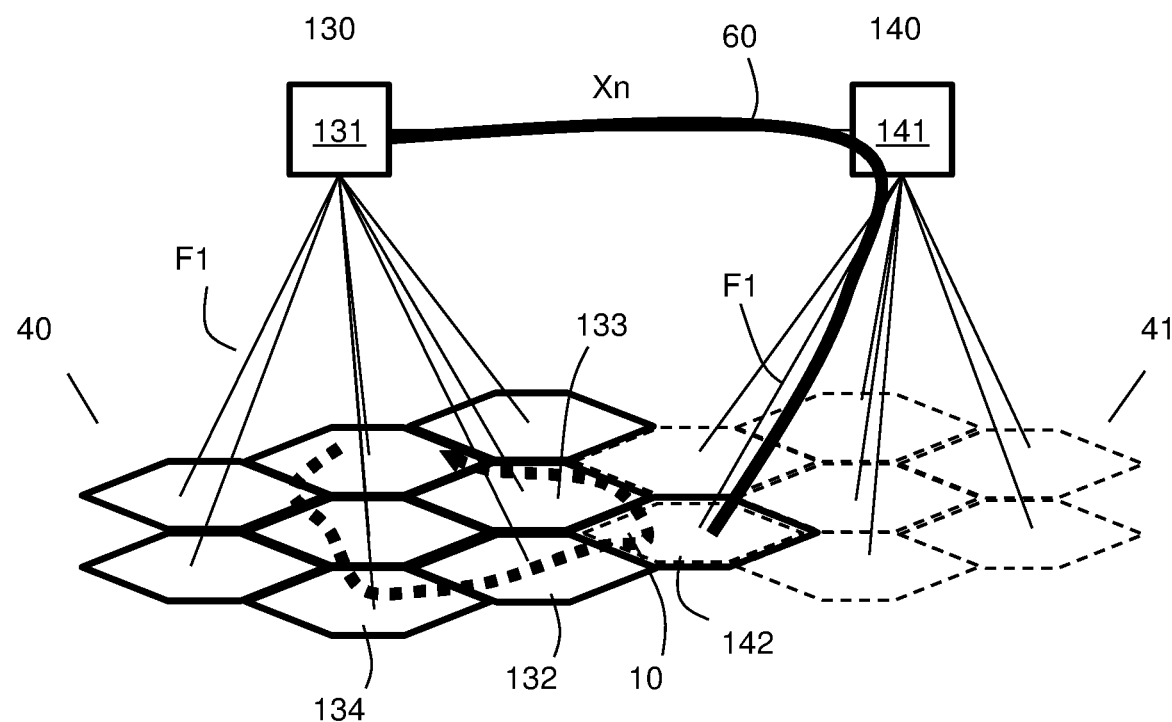
FIG. 6 schematically illustrates establishment of a connection between entities of two base stations covering different notification areas, and the forming of an updated notification area, according to various different embodiments.
Figure 7B:
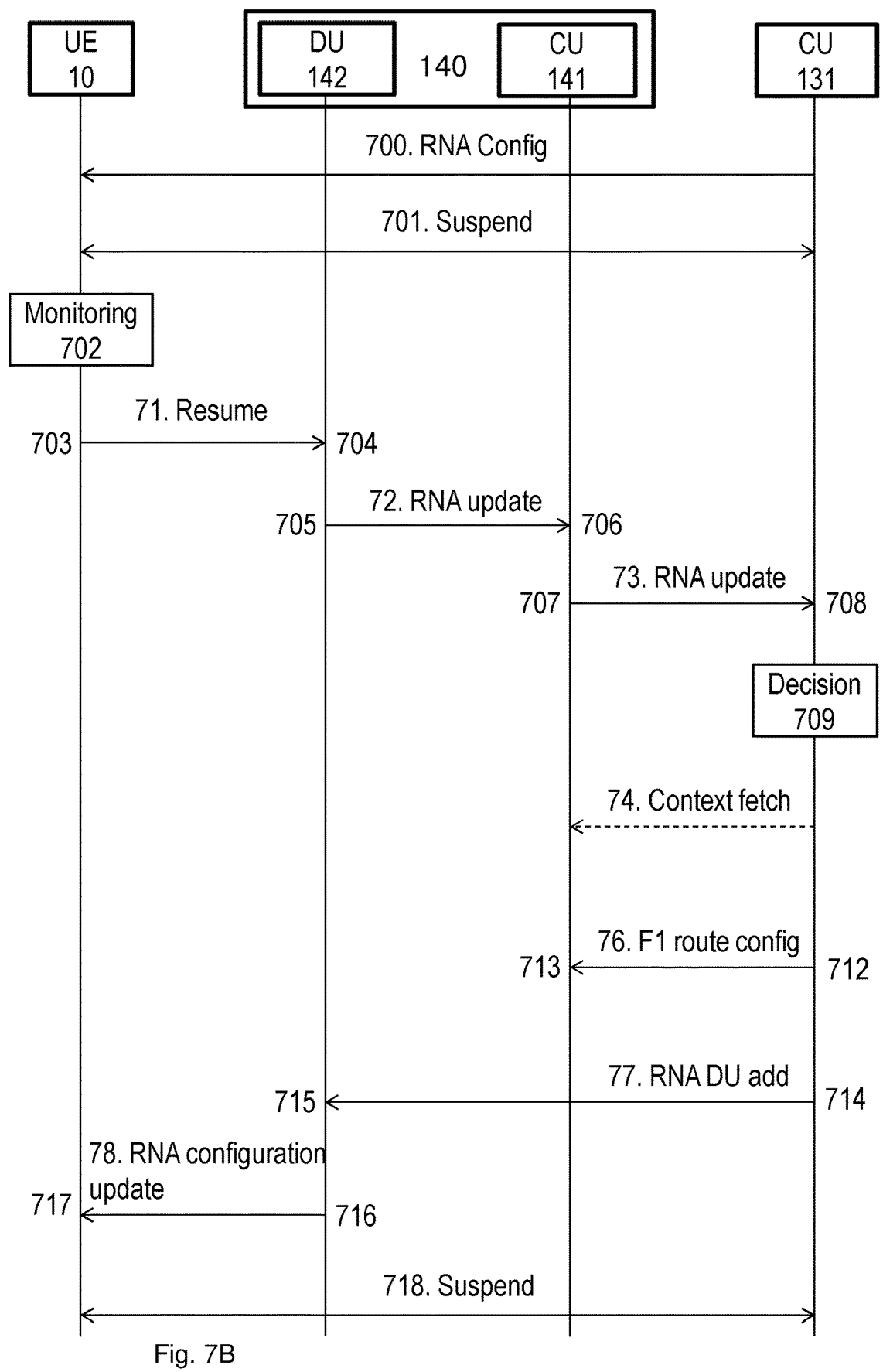
FIG. 7B schematically illustrates a signaling diagram for an embodiment operating in the scenario of FIG. 6.

FIG. 6 also illustrates the same scenario of UE 10 movement as in FIG. 4, and FIG. 7B illustrates an associated signaling diagram.

The differences between these two proposals lie in the connection established by the new DU 142, and these are specifically described below. As for common features between the proposals, the same reference numerals are used throughout the drawings and in the description below.

The UE 10 has a connection towards a DU of the first base station 130, connected to the first CU 131, such as DU 132. The UE 10 is released from RRC Connected mode by a procedure 701 to go into RRC_Inactive mode. In conjunction therewith, or previously, the UE 10 is configured 700 with a first notification area 40, such as a first RNA 40. In some embodiments, the first base station 130 may transmit a release message to the UE 10, including an information element with a list of cells that forms the RNA for the UE 10.

While monitoring 702 signals from base stations, such as pilot signals or reference signals as specified for cell re-selection, the UE 10 subsequently moves outside the initially configured first notification area 40, into an area covered by the DU 142 of the second base station 140.

Since the second base station 140 does not form part of the first notification area 40, the UE 10 initiates a radio notification area update (RNA-U) procedure towards the new base station 140. This may include transmitting 703 a resume message 71 to the second DU 142. The notification area update procedure may involve signaling RNA update information 72 with the CU 141 managing the new DU 142, and its associated cell DU-x into which the UE 10 has entered.

Instead of performing legacy context fetch 74 to the second CU 141 and path switch towards the core network, from the old first CU 131 to the new second CU 141, the new second CU 141 informs the first CU 131, as the anchor, of the triggered notification area update procedure triggered by the UE 10. Information 73 identifying the notification area update is thus signaled 707 from the new, second, CU 141 to the first CU 131, where the information 73 is received 708.

The first base station 130 is further configured to take the decision 709 to extend or modify its currently defined notification area 40 for the UE 10, by adding the new DU 142 to the list of DUs 132, 133 with are connected to the first CU 131.

Based on determining to extend or modify the currently defined notification area 40 for the UE 10, the method further comprises establishing a connection between said first CU 131 and said second DU 142. Specifically, rather than including the second base station 140 as such, with all its DUs, in the first notification area 40, only the DU 142 in question is included. This way, a method for controlled modification of the first notification area 40 is obtained.

In the embodiments following the proposal of FIGS. 5 and 7A, the connection 50 is established over an interface, e.g. F1, between the first CU 131 and said one second DU 142. This is in one embodiment obtained by adding an F1 interface 75 by communication from 710 the first CU to 711 the second DU 142. This way, the second DU 132 now has direct connections to both the first CU 131 and the second CU 141, as illustrated in FIG. 5. The IP address (or other addressing information e.g an URL or FQDN) of the second DU 142 may be provided in message 73 or by additional communication between CU 131 and CU 141 after the decision to include the DU 142 into RNA 40.

In the embodiments following the proposal of FIGS. 6 and 7B, the connection 60 is established over an inter base station communication interface, e.g. Xn, between the first CU 131 and the second CU 141, and an interface between the second CU 141 and said one second DU 141, such as an existing F1 interface. This may involve sending 712 routing information 76 from the first CU 131 for receipt 713 in the second CU 141 to set up and facilitate the connection 60.

In some embodiments, the connection includes an IP connection 50 between the first CU 131 and the second DU 142, or an IP connection 60 between the first CU 131 and the second CU 141. The IP connection may be configured by the first CU 131, or alternatively by the second DU 142 or the second CU 141. If a pre-configured IP connection is available, e.g. established for a UE-specific notification area for another UE, the first CU 131 may be configured to use routing information of a such a pre-configured IP connection. In various embodiments, the IP connection may be an IP tunnel, such as a secure IP tunnel.

Following both proposals, the UE 10 is subsequently configured with second information 78 identifying an addition of said one second DU 142 to said first notification area 40. This may involve communication 714 from the first CU 131 for reception 715 in the second DU 142, providing information 77 that the second DU 142 is added to the first notification area 40. Configuring the UE 10 with the second information 78 may further include sending the updated notification area information 78 from the second DU 142 to the UE 10.

The second information 78 may identify a cell ID of said one second DU. This need not be specific, since the UE 10 may already have obtained the cell ID in communication with the second DU 142 upon sending the resume message 71. An alternative to specifically identifying the cell ID may thus involve including a flag or code in the second information, indicating a current cell ID.

In some embodiments, the second information 78 identifies an instruction for the UE 10 to add said second DU 142 to the first notification area. The UE 10 may thus be configured, by means of a flag or code in the second information, to add the second DU 142, or the cell it serves, to an already stored first notification area 40. As noted, the instruction need not specifically identify the second DU 142 but may instead indicate a present cell to be added. The UE 10 may be configured to send an acknowledgment to the first CU 131 that the first notification area has been updated accordingly. This embodiment is alternative to providing a full update of the first notification area, and thus involves less data transmission.

In some embodiments, the first base station 130, such as the first CU 131, may be controlled or configured to take the decision 709 to either establish 75,76 said connection 50,60, or to alternatively provide 74 UE context information for said UE 10 to the second base station 140 in response to receiving said first information 73 identifying a notification area update. In some embodiments, this decision 709 may be based on recorded UE mobility data for the UE 10. A control function in the logic 310 of the first base station 130 is in one embodiment operated to take the decision 709 to either carry out a context fetch or set up a connection to the second DU 142 and include the second DU 142 in the first notification area 40. This control logic may be configured to take the mobility of the UE 10 into account, such that e.g. repeated or long-lasting presence of the UE 10 in the cell of the second DU 142, as determined by one or more rules or criteria. The first CU 131 may thereby be controlled, using said control function, to establish said connection 50,60 based on the recorded UE mobility data identifying at least one of or a predetermined combination of:

a) A level of mobility not exceeding a threshold level of mobility. The mobility, and the threshold of mobility, may in one embodiment be given by a value of speed of movement. Speed of movement of the UE 10 may be determined based on reports from the UE 10, or by positioning and speed determination carried out in the network 100. This may cause the control function to selectively establish the connection 50,60 to the second DU 142, responsive to the speed not exceeding a speed threshold value. This way, undue extension of the first notification area 40 may be avoided if the UE 10 is only determined to be passing the cell served by the second DU 142.

b) A number of DUs previously added to the first notification area 40 not exceeding a first threshold number. If the number does exceed the first threshold number, it may be that the user of the UE 10 has an irregular or extensive movement pattern, or that the UE 10 is successively travelling and potentially stopping in areas covered by different cells. The control function may thus determine that further extending the first notification area serves no benefit over dividing those areas into two or more notification areas.

c) A number of recorded previous times of connection of the UE 10 to said second DU 142 exceeding a second threshold number. The control function may thus be configured to determine that extending the first notification area will only take place if the UE 10 has entered the cell of the second DU 142 more than a predetermined number of times, as given by the second threshold number.

d) A time period since a last recorded connection of the UE 10 to said second DU 142 not exceeding a first threshold time period. The control function may thus be configured to determine that extending the first notification area will only take place if the UE 10 connects to the second DU 142 with a certain frequency, such that the time passed since a last connection does not exceed the first threshold time period.

e) A time period since last adding a DU to the first RNA exceeding a second threshold time period. If the time period does exceed the second threshold time period, this may be caused by the user of the UE 10 travelling or otherwise having an irregular or extensive movement pattern. The control function may thus determine that further extending the first notification area serves no benefit over dividing those areas into two or more notification areas.

Once the UE 10 has received 717 the second information identifying an addition of said second DU 142 to said first notification area 40, the UE 10 may be released 718 back to RRC_Inactive, the radio connection is now suspended.

Various embodiments have been outlined herein, relating to the configuration of a UE-specific notification area, such as an RNA. Except where they are clearly contradictory, the disclosed solutions and embodiments may be combined in any form. Various of those embodiments are outlined in the following clauses (C):

C1. Method for operating a first base station (130) for configuration of a first notification area (40), wherein first base station (130) comprises a first central unit (131), CU, and one or more first distributed units (132,133), DU, controlled by the first CU, the method comprising:

receiving (708) first information (73) identifying a notification area update from a second base station (140) comprising a second CU (141) and one or more second DUs (142,143) controlled by the second CU, wherein said first information is based on a message (71) identifying a notification area update procedure obtained in one (142) of said second DUs from a user equipment, UE, (10) being configured with a first notification area comprising the first base station;

establishing (710,712) a connection (50,60) between said first CU and said one second DU; and configuring (714) the UE with second information (78) identifying an addition of said one second DU to said first notification area.

C2. The method of C1, wherein establishing the connection includes configuring an IP connection.

C3. The method of C1, wherein establishing the connection includes using routing information of a pre-configured IP connection.

C4. The method of C2 or C3, wherein IP connection is a secure IP tunnel.

C5. The method of any of C1-C4, wherein an interface (F1) between the first CU and said one second DU is established over said connection (50).

C6. The method of any of C1-C4, wherein an interface (F1) between the first CU and said one second DU is established over said connection (60), comprising an inter base station communication interface (Xn) between the first CU and the second CU and an interface (F1) between the second CU and said one second DU.

C7. The method of any preceding clause, wherein configuring the UE comprises:

controlling said one second DU to transmit a message (78) to the UE identifying updated notification area information.

C8. The method of any preceding clause, wherein the information identifying the first notification area does not comprise said second base station (140).

C9. The method of any preceding clause, comprising, in response to receiving said first information (73):

controlling the first CU based on recorded UE mobility data for said UE to either:
establish (75,76) said connection, or
provide (74) UE context information for said UE to the second base station.

C10. The method of C9, wherein the first CU is controlled to establish said connection based on the recorded UE mobility data identifying at least one of or a predetermined combination of:

a level of mobility not exceeding a threshold level of mobility;

a number of DUs previously added to the first RNA not exceeding a first threshold number;

a number of recorded previous times of connection of the UE to said one second DU exceeding a second threshold number;

a time period since a last recorded connection of the UE to said one second DU not exceeding a first threshold time period;

a time period since last adding a DU to the first RNA exceeding a second threshold time period.

C11. The method of any preceding clause, wherein second information identifies a UE-specific notification area for the UE.

C12. The method of any preceding clause, wherein said second information identifies a cell ID of said one second DU.

C13. The method of claims any preceding clause, wherein said second information identifies an instruction for the UE to add said one second DU to the first notification area.

C14. Method for operating a user equipment (10), UE, to configure a notification area in a radio access network (120), comprising receiving (700) information identifying a first notification area (40) comprising a first base station (130), which first base station comprises a first central unit, CU, (131) and one or more first distributed units (132, 133), DU, controlled by the first CU;

receiving (702), from a second base station (140), a signal identifying a second DU (142) not forming part of the first notification area;

transmitting (703) a first message identifying a notification area update procedure to the second base station;

receiving (717) a second message from the second DU comprising updated notification area information (78) identifying an addition of said second DU to said first notification area.

C15. The method of C14, wherein the updated notification area information identifies a UE-specific notification area for the UE.

C16. The method of C14 or C15, wherein the updated notification area information identifies a cell ID of said one second DU.

C17. The method of C14 or C15, wherein the updated notification area information identifies an instruction for the UE to add said second DU to the first RNA.

C18. The method of any of C14-C17, wherein the information identifying the first notification area does not identify said second base station (140).

The invention claimed is:

1. A method for operating a first base station for configuration of a first notification area, wherein first base station comprises a first central unit (CU) and one or more first distributed units (DU) controlled by the first CU, the method comprising:
receiving first information identifying a notification area update from a second base station comprising a second CU and one or more second DUs controlled by the second CU,
wherein said first information is based on a message identifying a notification area update procedure obtained in one of said second DUs from a user equipment (UE) being configured with a first notification area comprising the first base station;
establishing a connection between said first CU and said one second DU; and
configuring the UE with second information identifying an addition of said one second DU to said first notification area.

2. The method of claim 1, wherein establishing the connection includes configuring an IP connection.

3. The method of claim 1, wherein establishing the connection includes using routing information of a pre-configured IP connection.

4. The method of claim 2, wherein the pre-configured IP connection is a secure IP tunnel.

5. The method of claim 1, wherein an interface between the first CU and said one second DU is established over said connection.

6. The method of claim 1, wherein an interface between the first CU and said one second DU is established over said connection, comprising an inter base station communication interface between the first CU and the second CU and an interface between the second CU and said one second DU.

7. The method of claim 1, wherein configuring the UE comprises: controlling said one second DU to transmit a message to the UE identifying updated notification area information.

8. The method of claim 1, wherein the information identifying the first notification area does not comprise said second base station.

9. The method of claim 1, comprising, in response to receiving said first information:
controlling the first CU based on recorded UE mobility data for said UE to either:
establish said connection, or
provide UE context information for said UE to the second base station.

10. The method of claim 9, wherein the first CU is controlled to establish said connection based on the recorded UE mobility data identifying at least one of or a predetermined combination of:
a level of mobility not exceeding a threshold level of mobility;
a number of DUs previously added to the first RNA not exceeding a first threshold number;
a number of recorded previous times of connection of the UE to said one second DU exceeding a second threshold number;
a time period since a last recorded connection of the UE to said one second DU not exceeding a first threshold time period; and
a time period since last adding a DU to the first RNA exceeding a second threshold time period.

11. The method of claim 1, wherein said second information identifies a UE-specific notification area for the UE.

12. The method of claim 1, wherein said second information identifies a cell ID of said one second DU.

13. The method of claim 1, wherein said second information identifies an instruction for the UE to add said one second DU to the first notification area.

14. A method for operating a user equipment (UE) to configure a notification area in a radio access network, comprising:
receiving information identifying a first notification area comprising a first base station, which first base station comprises a first central unit (CU) and one or more first distributed units (DU) controlled by the first CU;
receiving, from a second base station, a signal identifying a second DU not forming part of the first notification area;
transmitting a first message identifying a notification area update procedure to the second base station; and
receiving a second message from the second DU comprising updated notification area information identifying an addition of said second DU to said first notification area.

15. The method of claim 14, wherein the information identifying the first notification area does not comprise said second base station.

16. The method of claim 14, wherein the updated notification area information identifies a UE-specific notification area for the UE.

17. The method of claim 14, wherein the updated notification area information identifies a cell ID of said one second DU.

18. The method of claim 14, wherein the updated notification area information identifies an instruction for the UE to add said second DU to the first RNA.

* * * * *